United States Patent [19]

Cohen

[11] Patent Number: 5,042,194
[45] Date of Patent: * Aug. 27, 1991

[54] INSECT TRAPS

[75] Inventor: Harold L. Cohen, Buffalo, N.Y.

[73] Assignee: The Research Foundation of State University of New York, Albany, N.Y.

[*] Notice: The portion of the term of this patent subsequent to Apr. 11, 2006 has been disclaimed.

[21] Appl. No.: 210,239

[22] Filed: Jun. 23, 1988

Related U.S. Application Data

[63] Continuation of Ser. No. 25,436, Mar. 13, 1987, Pat. No. 4,819,371.

[51] Int. Cl.⁵ .............................................. A01M 1/20
[52] U.S. Cl. ........................................ 43/131; 43/107
[58] Field of Search ................ 43/107, 114, 121, 124, 43/131, 132.1

[56] References Cited

U.S. PATENT DOCUMENTS 3,304,646  2/1967  Staley .................................... 43/131

OTHER PUBLICATIONS

Harold L. Cohen, Bug Traps: Insect Control Through Product Design/Development; XI International Congress for Tropical Medicine and Malaria, Calgary, Canada, Sep. 17, 1984.

Primary Examiner—Kurt Rowan
Attorney, Agent, or Firm—Howard M. Ellis; Michael L. Dunn

[57] ABSTRACT

A generally rectangular-shaped enclosure with an interior diagonal divider provides dual triangular-shaped chambers which when coated with a contact poison offers an especially effective means for reducing populations of triatomids, such as *Rhodnius prolixus*, the principal assassin bug responsible for transmitting deadly Chagas' disease.

20 Claims, 1 Drawing Sheet

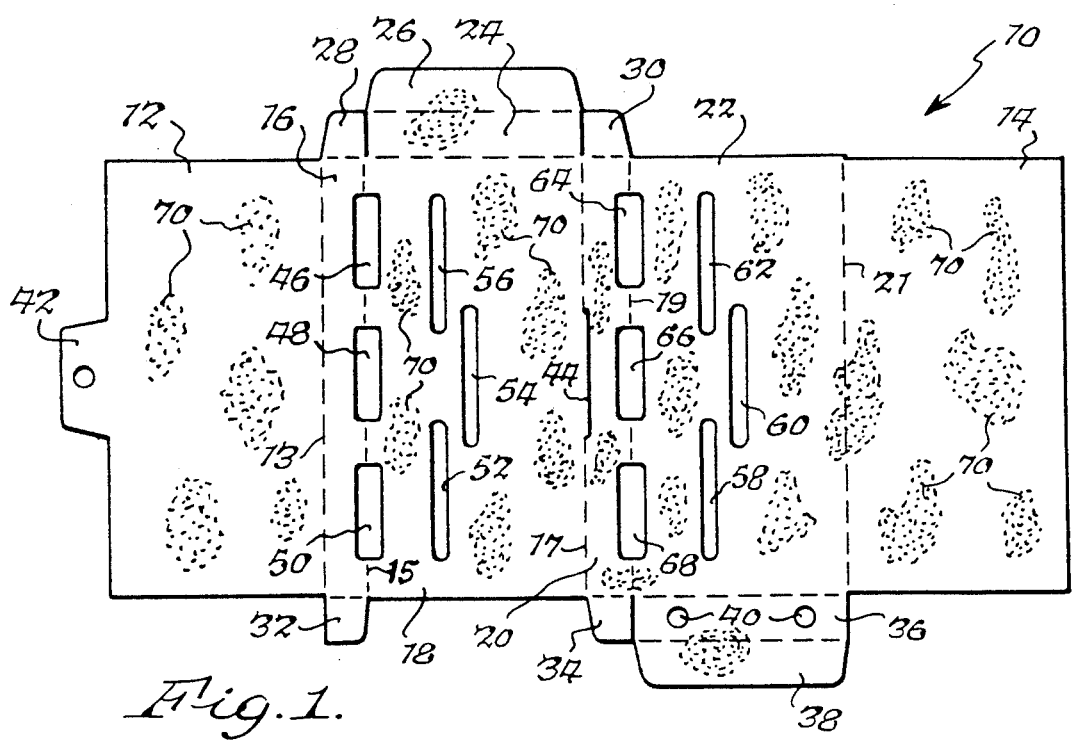

INSECT TRAPS

This is a continuation of application Ser. No. 025,436, filed Mar. 13, 1987, now U.S. Pat. No. 4,819,371.

BACKGROUND OF THE INVENTION

The present invention relates generally to devices for controlling insect populations, and more specifically, to traps which are especially useful in eradicating vectors or insects which transmit pathogens, such as the parasite responsible for Chagas' disease.

Chagas' disease is the most common form of trypanosomiasis in the Americas. An estimated 65 million people are at risk, and an estimated 20 million people are currently infected with the disease. It is commonly transmitted by large, blood-sucking triatomine (assassin) bugs such as from Venezuela, *Rhodnius prolixus*. This and other species of triatomids live in the roofs and walls of dwellings of the poor throughout South and Central America. The assassin bugs prefer structures which provide shelter for them. They include structures made of adobe, bahareque, a building technique using woven twigs, leaves and mud; wood and poorly constructed concrete blocks.

The causative agent of Chagas' disease, *Trypanosoma cruzi*, lives in the blood of its human victims and of the rodents and marsupials commonly found in rural areas. It is ingested by the assassin bug as part of its blood meal. The parasite passes through the bug's digestive tract, and is deposited in its feces and then on the skin of its victim. The parasite eventually enters the circulatory system either by being scratched into a wound or through the eyes whereupon it attacks the tissues of various organs, and particularly the heart, eventually causing death of the host.

International and national public health strategies have emphasized eradicating or controlling insect vectors in order to minimize the spread of disease. Since the 1940's, the effectiveness of this strategy has depended upon the widespread use of chemical pesticides. It was once expected that pesticides alone would be sufficient to eliminate the threat of major insect-born diseases. Reliance on such a highly specialized strategy has for some time been questioned because of the problems it has caused, e.g. unintentional extermination of beneficial species, accelerated mutation of resistance to chemicals in vectors, lingering environmental pollution causing secondary public health problems, inflationary costs representing a financial drain on the fragile economies of developing nations and on the limited budgets of international agencies and chronic organizational and bureaucratic problems which have inhibited effective delivery of services to affected populations.

In Venezuela, for example, the government's approach to building and renovating housing has been ineffective both socially and structurally. Reports indicate that some of the effectiveness of chemical sprays was neutralized within a short time period because of the lime content of white-washed walls of rural houses. The concrete block material used in new building construction fractured in a short period of two years. This, along with poor traditional construction methods, help to provide increased breeding grounds for the vector. Hence, although chemical means remain an important part of the strategies for controlling disease vectors, alternative lower cost, environmentally safe means are needed for controlling insect populations, particularly those associated with the transmission of disease. Such alternatives have been limited, e.g. by the previously unpredictable behavior which reduced the effectiveness of proposed traps.

SUMMARY OF THE INVENTION

It has now been unexpectedly discovered that the triatomid assassin bugs tend not to enter an opening which is removed from their line of travel, i.e. they tend not to search for openings but rather use them only if found in their normal path.

It is, therefore, a primary object of the invention to provide an insect trap which comprises a generally rectangular-shaped enclosure having outer walls defining an interior chamber, the trap comprising divider means for separating the interior chamber into adjacent substantially triangular-shaped hollow bodies, such triangular shapes having been found to be appealing to the assassin bugs. Two adjoining outer walls provide the legs of each triangular-shaped body, each body having at least one insect entrance of sufficient size generally in the region where the legs of each triangular body are adjoined to one another.

Another object of the invention is to provide an insect trap, as described above, wherein the triangular hollow bodies are right triangular shaped with two adjoining outer walls each forming a right angle with insect entrances located in the right angles.

A still further object of the invention is to provide a insect trap, as described above, which includes additional insect entrances in a planar surface of at least one leg of each right triangular-shaped body, thus intercepting any straight line of travel over the trap.

A still further object is the positioning of such entrances in such a way as to permit a darkened area within the trap in which the bug may hide during daylight.

A still further object of the invention is to provide an improved insect trap having an insecticide positioned in each hollow body of the trap.

A further object of the invention is to provide an improved insect trap, as defined above, wherein the insecticide is a contact poison printed or otherwise coated onto the interior walls of each hollow body.

DESCRIPTION OF THE DRAWINGS

For a further understanding of the invention as well as its characterizing features, reference should now be made to the following detailed description thereof taken in conjunction with the accompanying drawings, wherein:

FIG. 1 is a top view of an unfolded blank for the insect trap of the invention with folding scores and insecticide applied to all interior surfaces.

FIG. 2 is a perspective view of the assembled insect trap prepared from the blank of FIG. 1.

FIG. 3 is an enlarged end sectional view taken along line 3—3 of FIG. 2 with assassin bugs positioned in the regions of the vertex of the triangular-shaped hollow bodies.

DETAILED DESCRIPTION OF THE INVENTION

Turning first to FIG. 1, there is shown a paperboard blank 10 which can be folded and assembled into a useful insect trap according to FIG. 2. The paperboard blank preferably comprises an outer coating (not shown) such as a wax, synthetic polyolefin or any equivalent coating which is suitable in preventing rapid deterioration from moisture and other weather conditions. The thickness of the paperboard should also be sufficient to impart adequate rigidity to the assembled trap.

Blank 10 comprises six principal panels: first and second interior divider panels 12, 14 at each end of the blank, and first, second, third and fourth outer wall panels 16, 18, 20, 22, respectively, positioned between the first and second interior divider panels. Scoring 13, 15, 17, 19, 21 between each of the six panels permits easy folding of the blank into a generally rectangular-shaped enclosure 25. "Rectangular-shaped enclosure" for purposes of this invention is intended to mean any four-sided body having four right angles, including substantially square bodies, and bodies shaped like rectangles.

First and second outer wall panels 16, 18 are perforated to form edge-type insect entrances 46, 48, 50 which overlap both outer wall panels. Third and fourth outer wall panels 20, 22 also have multiple edge-type insect entrances 64, 66, 68 overlapping the two panels. The first, second, third and fourth outer wall panels 16, 18, 20 and 22, respectively are interconnected side walls. Insect entrances should be sufficiently wide to allow easy entry of the largest species being eradicated in a particular situation. This would include large openings for the triatomine vector, as well as for cockroaches including the American, German and Madagascar species. Obviously, smaller species of insect vectors like bedbugs and lice of which the insect traps disclosed herein are useful, can have entrances of smaller dimension.

Edge-type insect entrances 46, 48, 50, 64, 66, 68, are shown spaced from one another. By spacing the insect entrances from each other added, structural rigidity and strength are imparted to the trap. However, the present invention contemplates at least one edge-type entrance for each of the pairs of outer wall panels. Thus, for example, instead of multiple entrances 46, 48, 50 being spaced from one another, the invention also contemplates the use of a single large insect entrance in place thereof.

Blank 10 preferably includes particularly for the triatomine vector additional spaced slots 52, 54, 56 as entrances in the second outer wall panel 18. Additional spaced slots 58, 60, 62 as insect entrances are also preferred in the fourth outer wall panel 22. The additional insect entrances should be in close proximity to edge-type entrances in order to restrict the amount of light entering the confined areas favored by the triatomine vector, as more fully discussed below. It is preferred that the additional spaced slots be generally parallel with the edge type insect entrances because the triatomine vector's tendency to travel in a nonsearching, straight path.

Blank 10 also includes means for forming an enclosure, i.e. tabs 28, 30 and end-closure 24, 26; tabs 32, 34 and end-closure 36, 38. End-closures 24 and 36 provide end walls for the trap when assembled. Closure 36 may also have observation openings 40 for visual checking for insects. In addition, an assembly tab 42 at the end of the first divider panel 12 may be used as a suspending means for hanging traps on walls, etc. Tab 42 engages with slit 44 at the time of assembly.

The surface of the blank which will form the interior walls of the trap is treated with appropriate insecticide 70 (FIGS. 1 and 2). The paperboard stock can be most conveniently treated with insecticide prior to being formed into a blank. That is, the interior surface of an entire sheet of paperboard can be treated by spraying, brushing, painting, and the like, prior to or even after being formed into an insect trap blank. One preferred embodiment provides for treating the paperboard with an insecticidal "ink" composition comprising pigment, solvents, and insecticide. The composition can be applied to the interior surface by means of an ink roller. The insecticides of choice in the case of the triatomine vector are the well known contact poisons which penetrate the blood directly through the insect cuticle. They preferably include pyrethrum esters, and particularly, permethrin, a synthetic pyrethroid. The insecticides may also include attractants which function to lure insects into the trap, such as through sex hormones, etc.

Blank 10 can be easily assembled into an insect trap like that shown in FIG. 2 by folding the first diagonal divider panel 12 over the second outer wall panel 18 which is secured by inserting assembly tab 42 through slit 44. A first substantially triangular-shaped hollow body is formed. The expression "substantially triangular shaped" is intended not only to include three-sided bodies, but also bodies which may have a fourth side, i.e. a wall is used in place of the apex of the triangle. An adhesive (not shown) is preferably applied to the backside of divider panel 12 and second diagonal divider panel 14 folded over so the backside of panel 14 makes physical contact with the adhesive applied to panel 12. This forms an internal chamber divided diagonally into adjacent triangular-shaped hollow bodies. Tabs and end-closures are then folded inwardly to form a sturdy, economical insect trap which can be mass produced at a cost which makes it affordable for use by populations of the poor in need throughout South and Central America.

FIG. 3 provides an end-sectional view of the generally rectangular-shaped trap of FIG. 2 with divider means 71 separating the trap into adjacent right triangular-shaped hollow bodies 72, 74. The hollow bodies provide dual insect chambers which are especially attractive to the vector of Chagas' disease, such as the triatomid *Rhodnius prolixus* 73. In this regard, the insect, which is nocturnal, seeks shelter in closely confined spaces during the light hours. Behavioral studies have shown that this insect vector prefers structures which will not only shelter them from daylight, but also confining areas which allow the posterior portions of their bodies to be easily nestled up to and make contact with surfaces of the shelter. Hence, the vertex regions 75, 84 of right triangular hollow bodies 72, 74, respectively, provide the type of close confining shelter which assassin bugs find especially alluring.

The bugs enter the trap at lower level entrances 80, 83 or upper level entrances 81, 82 (FIG. 3). In this regard, it will be observed the generally right angular configuration at entrance 80 formed by right triangle legs 76, 78, and right angular configuration at entrance 81 formed by right triangle legs 77, 79. This type of opening provides easy access to the trap interior chambers without emitting excessive light to the vertex regions.

Entrances 82, 83 provide added assurance that the insect will enter the trap especially when approaching the outside wall along triangle legs 77, 78 at a point distal from edge entrances 80, 81. The location of alternative entrances 82, 83 should be in proximity to edge entrances to restrict the amount of light entering the interior of the trap in vertex regions 75, 84.

Although it is desirable for the triatomine vector to remain inside the trap, in the event it quickly exits the trap the coating of contact poison, permethrin, on the interior surfaces of the trap is readily absorbed and will kill the insect usually within a few hours or even less.

An early design of an insect trap for the triatomine vector was described in a paper presented at a workshop on Sept. 17, 1984 by Harold L. Cohen during a meeting of the XI International Congress for Tropical Medicine and Malaria in Calgary, Canada. This pioneering work did establish the validity of insect traps as a potentially useful means for controlling the triatomine vector. However, test results with this earliest trap did not prove to be totally acceptable because of relatively small reductions in insect populations. It is thought that the locations of the insect entrances and/or possibly the dimensions of the openings and other design features were the primary cause of the generally unacceptable results with this earliest insect trap. At this point the unexpected "line of travel" behavior of the insect was either not known or not recognized as being important.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

I claim:

1. An insect trap which comprises a generally rectangular shaped enclosure having interconnected outer side walls and outer opposing end walls engaging with said side walls to provide a closed interior chamber, said trap comprising divider means for separating said closed interior chamber into adjacent substantially right triangular shaped hollow bodies with two adjoining outer side walls forming a right angle for each triangular-shaped body, each hollow body of said trap having at least one insect entrance located in proximity to said right angle.

2. The insect trap of claim 1 wherein the insect entrances to each hollow body are spaced slots.

3. The insect trap of claim 2 including additional insect entrances in a leg spaced from the insect entrances at said right angles.

4. The insect trap of claim 3 wherein the divider means for separating the interior chamber is imperforate.

5. The insect trap of claim 3 wherein the insecticide is a contact poison.

6. The insect trap of claim 5 wherein the insecticide is a pigmented contact poison applied to the interior walls of the hollow bodies.

7. A blank for forming the insect trap of claim 1.
8. A blank for forming the insect trap of claim 2.
9. A blank for forming the insect trap of claim 3.
10. A blank for forming the insect trap of claim 4.
11. A blank for forming the insect trap of claim 5.
12. A blank for forming the insect trap of claim 6.

13. An insect trap which comprises a generally rectangular-shaped enclosure having interconnected outer side walls and outer opposing end walls engaging with said side walls to provide a closed interior chamber, said trap comprising divider means for separating said closed interior chamber into adjacent substantially triangular shaped hollow bodies in which at least two adjacent outer side walls provide the legs of each substantially triangular-shaped body, each body of said trap having at least one insect entrance of sufficient size located in said adjacent outer side walls.

14. The insect trap of claim 13 including an insecticide positioned in said hollow bodies.

15. The insect trap of claim 14 wherein the insecticide is applied to the interior walls of the hollow bodies.

16. The insect trap of claim 14 in combination with an insect attractant.

17. A blank for forming the insect trap of claim 13.
18. A blank for forming the insect trap of claim 14.
19. A blank for forming the insect trap of claim 15.
20. A blank for forming the insect trap of claim 16.

* * * * *